ELLA PORTINGTON.
Vegetable-Dish.
No. 164,208.
Patented June 8, 1875.
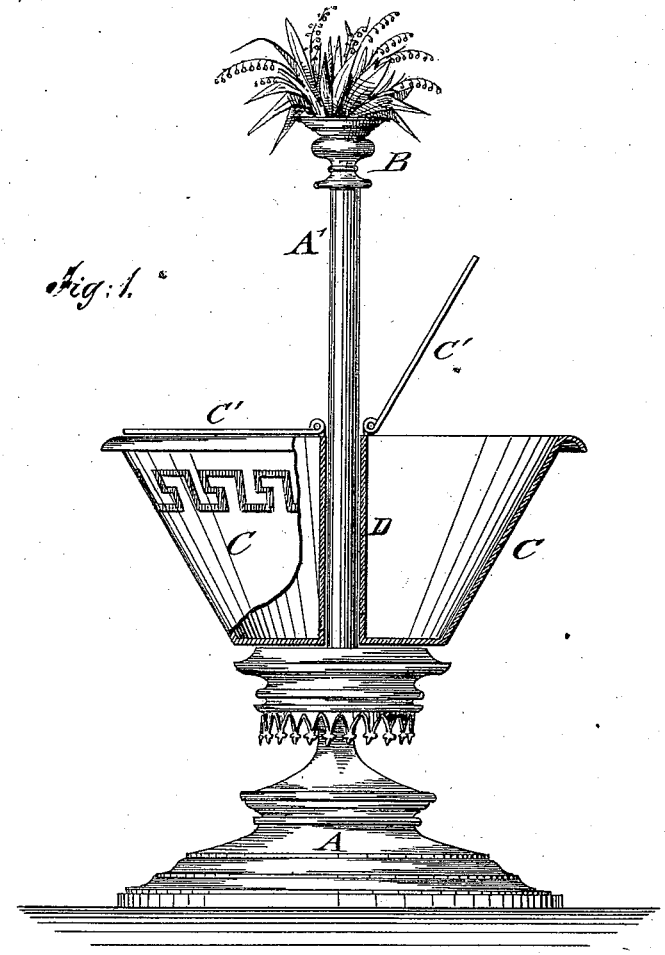
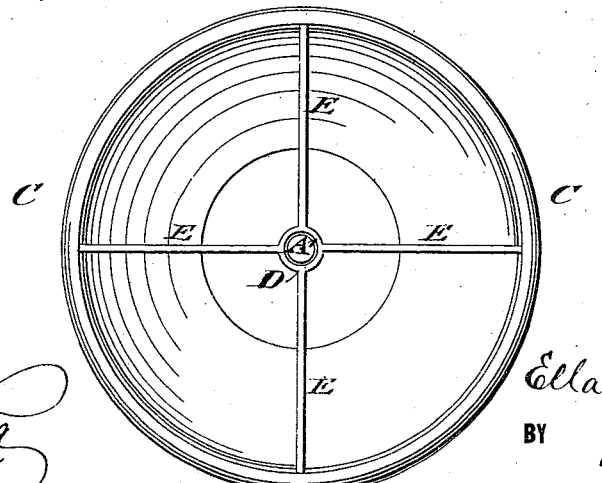
WITNESSES:
INVENTOR:
Ella Portington
BY
ATTORNEYS.
THE GRAPHIC CO.PHOTO-LITH.39 & 41 PARK PLACE,N.Y.

UNITED STATES PATENT OFFICE.

ELLA PORTINGTON, OF FACTORYVILLE, NEW YORK.

IMPROVEMENT IN VEGETABLE-DISHES.

Specification forming part of Letters Patent No. 164,208, dated June 8, 1875; application filed May 1, 1875.

*To all whom it may concern:*

Be it known that I, Mrs. ELLA PORTINGTON, of Factoryville, in the county of Richmond and State of New York, have invented a new and Improved Vegetable-Dish, of which the following is a specification:

In the accompanying drawing, Figure 1 represents a side elevation, partly in section, of my improved vegetable-dish; and Fig. 2 is a top view of the dish detached from the stand.

Similar letters of reference indicate corresponding parts.

The object of my invention is to furnish, for the purpose of cooking, heating, and serving vegetables and other viands, an improved dish, that may be readily taken from the stove and placed on the table for use, combining in one neat and practical device the advantages of three or more separate dishes, while allowing a far more convenient handling of the same. My invention consists of a vessel provided with radial partitions, forming subdivisions, and a tubular center part, for being placed and rotated on a stand.

In the drawing, C represents a vegetable-dish of any suitable size, shape, and material, according to the purpose required. It may be silver-plated and porcelain-lined in ornamental manner, or made of china or common tin, and divided by radial partition-walls E into any desired number of compartments, with or without lids C'. A central socket-tube, D, of dish C serves to place the same readily on the upright standard A' of a supporting-base, A, on which the dish rotates in the nature of a caster. A nut, B, at the upper end of standard A' may be screwed on or unscrewed from the standard after the dish is placed on the same, or when it is to be taken off therefrom. The nut serves also as a knob-handle, ornamental flower-holder, or any other suitable purpose. The vegetables or other articles are placed into the different compartments of the dish and placed on the stove for being cooked or kept warm until the dish is needed. It is then placed on the standard, served therewith, forming a number of dishes in one, and allowing the convenient serving and using of the same for the various public and domestic applications.

Having thus described my invention, I claim as new and desire to secure by Letters Patent—

1. A vegetable-dish composed of a detachable and subdivided vessel, revolving on a supporting-stand, substantially as and for the purpose set forth.

2. A vegetable-dish having radial partitions, forming compartments for different articles, and a central socket-tube for being detached from and replaced on the stand, substantially for the purpose specified.

ELLA PORTINGTON.

Witnesses:
T. B. MOSHER,
ALEX. F. ROBERTS.